US010322712B2

(12) United States Patent
Miller et al.

(10) Patent No.: US 10,322,712 B2
(45) Date of Patent: Jun. 18, 2019

(54) METHODS AND SYSTEM FOR IMPROVING HYBRID VEHICLE EFFICIENCY

(71) Applicant: Ford Global Technologies, LLC, Dearborn, MI (US)

(72) Inventors: Kenneth James Miller, Canton, MI (US); Douglas Raymond Martin, Canton, MI (US); Ted Haladyna, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 280 days.

(21) Appl. No.: 15/015,970

(22) Filed: Feb. 4, 2016

(65) Prior Publication Data

US 2017/0225672 A1 Aug. 10, 2017

(51) Int. Cl.
| | |
|---|---|
| B60W 20/00 | (2016.01) |
| B60W 10/10 | (2012.01) |
| B60W 20/15 | (2016.01) |
| B60W 10/06 | (2006.01) |
| B60W 10/08 | (2006.01) |
| B60W 50/08 | (2012.01) |
| B60W 50/16 | (2012.01) |
| B60W 50/00 | (2006.01) |

(52) U.S. Cl.
CPC ........... *B60W 20/15* (2016.01); *B60W 10/06* (2013.01); *B60W 10/08* (2013.01); *B60W 50/082* (2013.01); *B60W 50/16* (2013.01); *B60W 2050/0026* (2013.01); *B60W 2540/10* (2013.01); *B60Y 2200/92* (2013.01); *B60Y 2300/182* (2013.01); *B60Y 2300/1882* (2013.01); *B60Y 2300/52* (2013.01); *Y10S 903/93* (2013.01)

(58) Field of Classification Search
CPC .................. B60W 2050/0026; B60Y 2300/52
USPC .......................................... 701/22
See application file for complete search history.

(56) References Cited

U.S. PATENT DOCUMENTS

| | | | |
|---|---|---|---|
| 6,335,610 B1 | 1/2002 | Winstead | |
| 2004/0020283 A1* | 2/2004 | Minanni | B60W 10/06 73/115.02 |
| 2015/0025760 A1* | 1/2015 | Tachibana | B60W 10/101 701/54 |

* cited by examiner

*Primary Examiner* — Charles J Han
(74) *Attorney, Agent, or Firm* — David Kelley; McCoy Russell LLP (57) ABSTRACT

Systems and methods for operating a hybrid powertrain that includes an engine and a motor/generator are described. The systems and methods provide different ways to transition engine operating conditions between two low engine fuel consumption operating regions that are separated by a higher engine fuel consumption operating region. In one example, engine torque is increased at a higher rate in a fuel economy mode to increase an amount of time an engine operates in one of the two low fuel consumption operating regions.

5 Claims, 6 Drawing Sheets

METHODS AND SYSTEM FOR IMPROVING HYBRID VEHICLE EFFICIENCY

FIELD

The present description relates to methods and a system for operating a powertrain of a hybrid vehicle. The methods and systems may be particularly useful for hybrid vehicles that provide wheel torque via an engine, motor, and transmission.

BACKGROUND AND SUMMARY

An engine of a hybrid vehicle may propel the hybrid vehicle or provide energy to charge a battery of the hybrid vehicle. The engine may have a broad operating range such that the engine may be operated across a wide range of engine speed and torque conditions. However, it may be desirable to operate the engine at its most efficient operating conditions to conserve fuel. One way to ensure that the engine is operating efficiently is to adjust engine operating conditions so that the engine operates at conditions where it is most efficient. Nevertheless, varying driver demand power and road conditions may make it difficult for the engine to stay in an operating range where its fuel consumption is lowest. As a result, the engine may be operated outside of a low fuel consumption operating region to meet driving conditions. The vehicle's fuel consumption may increase greater than is desired if the vehicle is operated outside of low fuel consumption engine operating conditions for more than a threshold amount of time.

The inventors herein have recognized the above-mentioned issues and have developed a powertrain operating method, comprising: providing a first relationship between driver demand power and requested powertrain power via a controller in an engine power region between a first engine low fuel consumption operating region and a second engine low fuel consumption operating region in a first operating mode; providing a second relationship between driver demand power and requested powertrain power via the controller in the engine power region in a second operating mode, the engine power region a higher engine fuel consumption region than the first and second engine low fuel consumption regions; and operating an engine in response to the first and second relationships.

By providing different relationships between a driver demand power request and an engine power request, it may be possible to transition engine operating conditions between a first engine low fuel consumption region and a second engine low fuel consumption region faster. For example, a change in requested engine power versus requested driver demand power may be increased for an engine operating region that lies at engine speed and torque values that are between engine speed and torque values for two low engine fuel consumption operating regions. Consequently, a driver may transition or move from a first low engine fuel consumption operating region to a second low engine fuel consumption operating region in a shorter period of time to improve vehicle fuel economy.

The present description may provide several advantages. Specifically, the approach may provide increased powertrain efficiency. Further, the approach provides feedback to a driver that may help to increase vehicle fuel efficiency. Additionally, the approach may utilize a motor in conjunction with an engine to improve vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to improving a possibility of operating an engine of a hybrid vehicle at efficient operating conditions. Engine operating conditions may be adjusted in conjunction with motor operating conditions to improve powertrain efficiency. In one example, the engine may be of the type shown in FIG. 1. The engine and motor may be incorporated into a powertrain as is shown in FIG. 2. The engine may include two low fuel consumption operating regions as shown in the engine brake specific fuel consumption (BFSC) map shown in FIG. 3. Engine operation may be adjusted as shown in FIG. 4 to improve the possibility of operating the engine in an efficient operating region. The powertrain may operate according to the sequence shown in FIG. 5 during economy and non-economy operating modes. The hybrid vehicle may operate according to the method described by the flowchart shown in FIG. 6.

Figure 1:
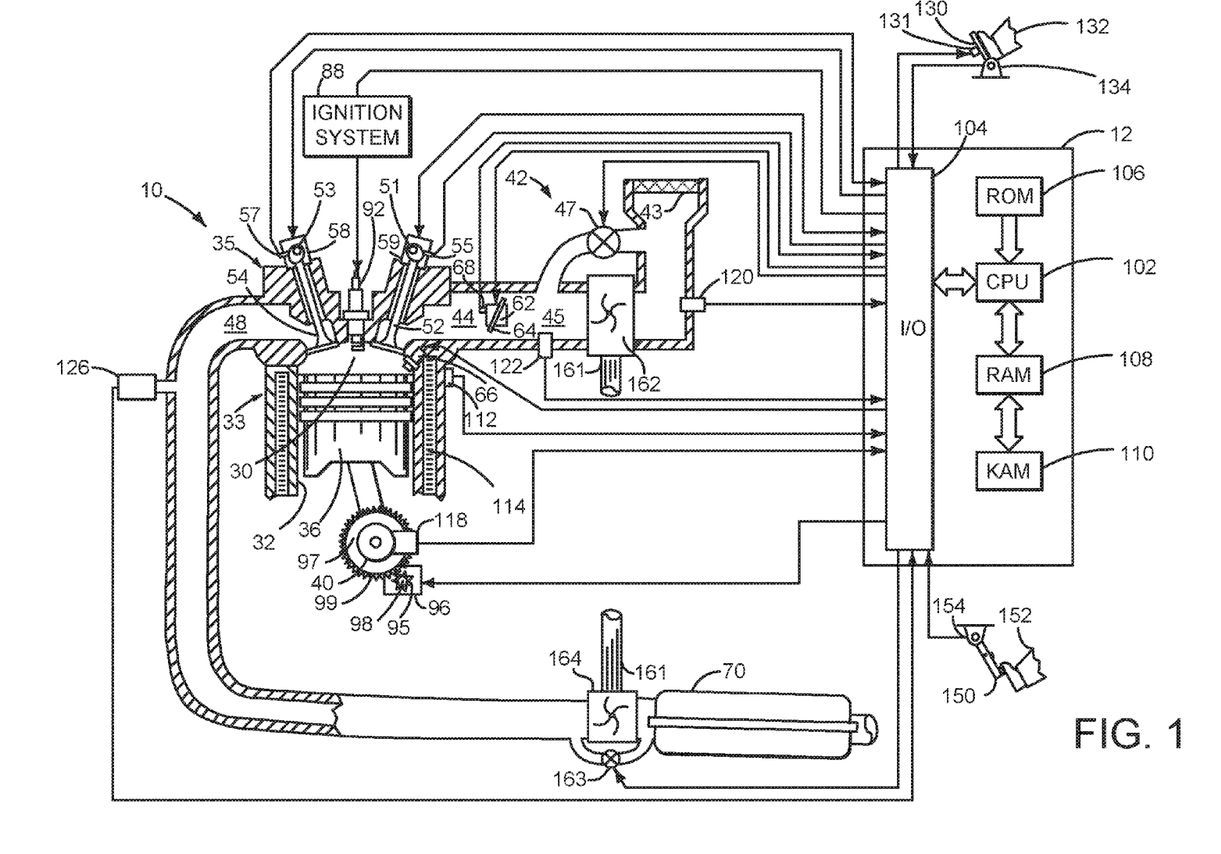
FIG. 1 is a schematic diagram of an engine.
Figure 2:
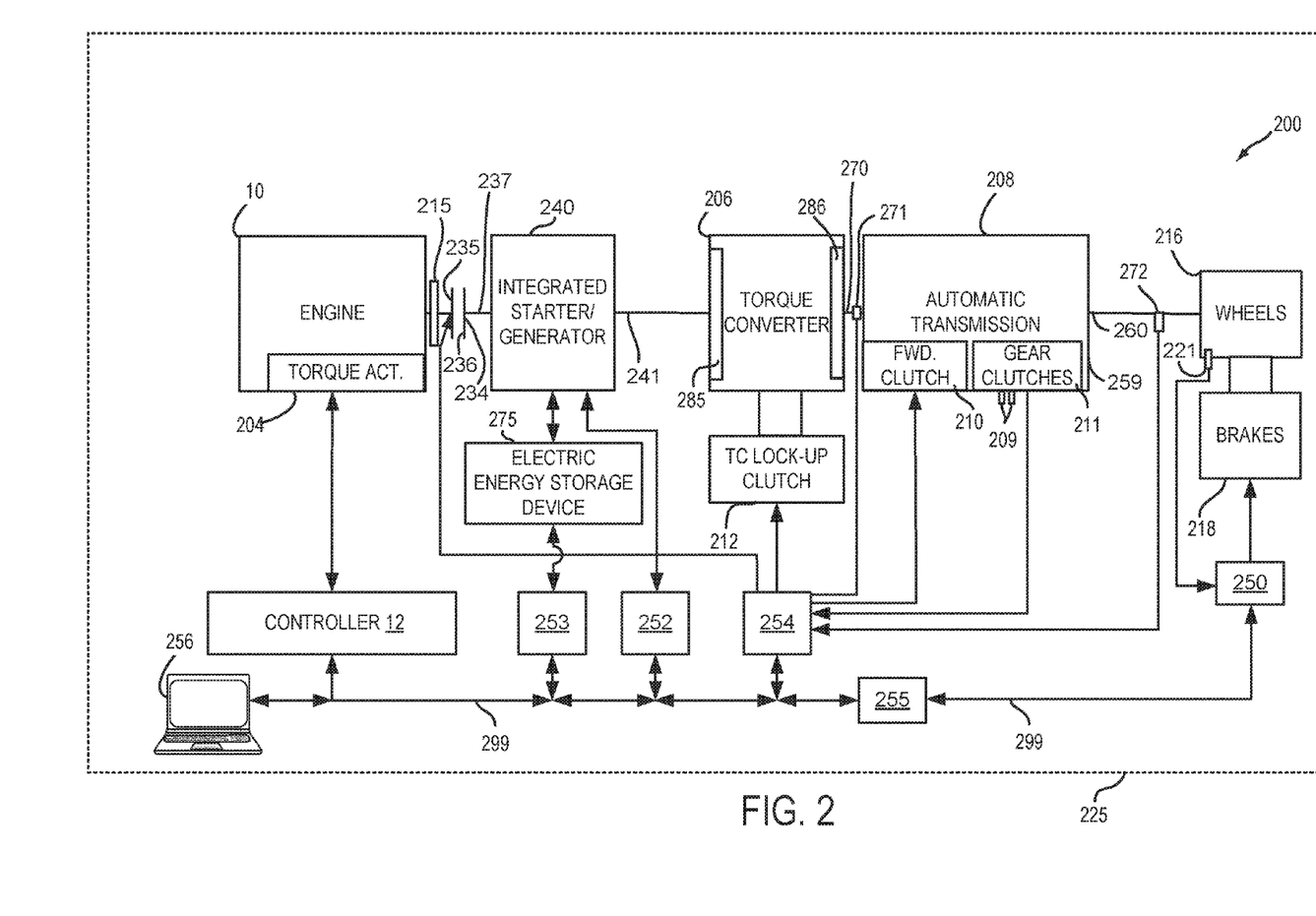
FIG. 2 is a schematic diagram of a hybrid vehicle powertrain.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a haptic actuator 131; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions. Status information may be provided to a driver via human/machine interface 256 (e.g., keyboard and display).

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, powertrain control devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Figure 3:
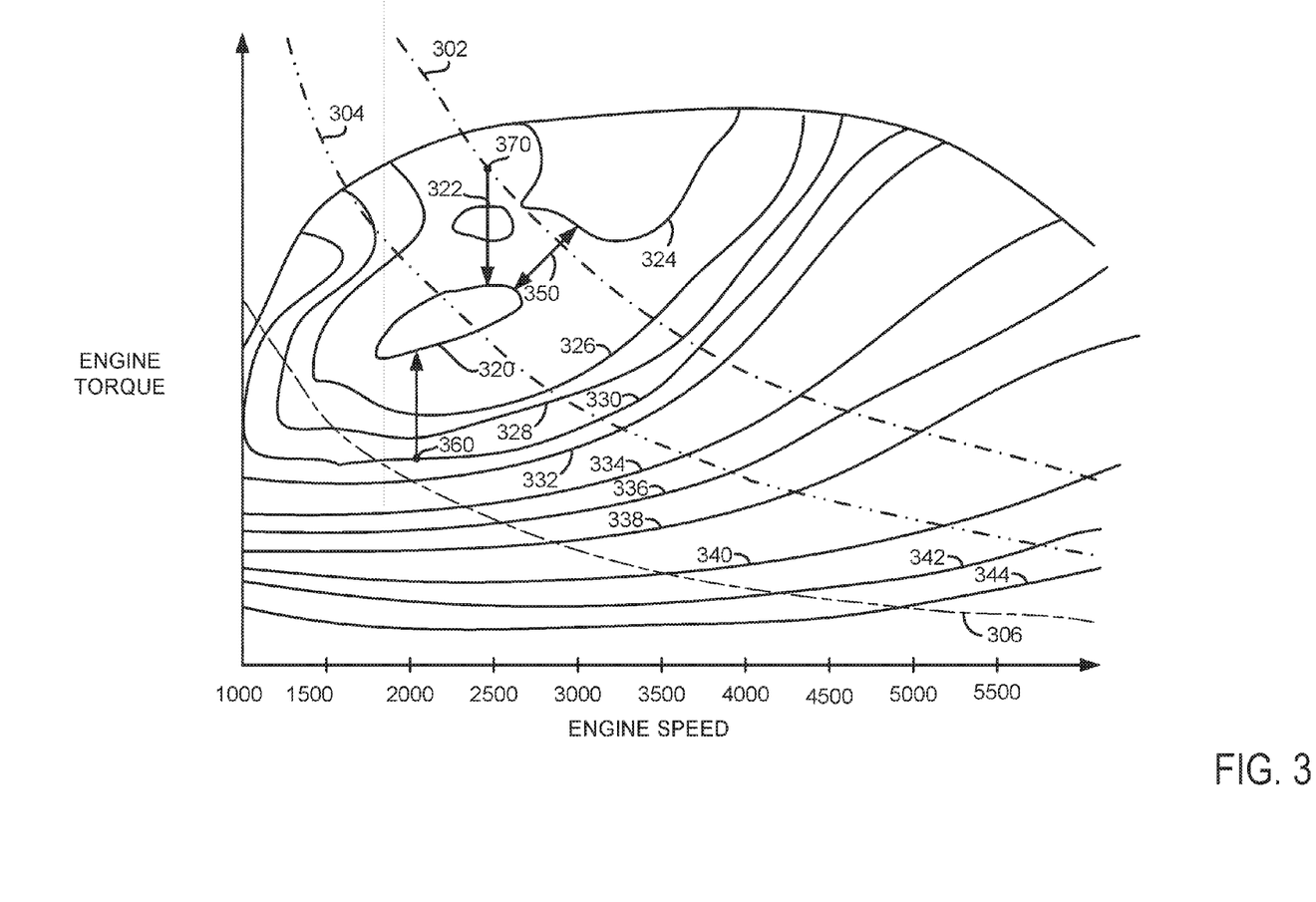
FIG. 3 is a plot showing an example engine brake specific fuel consumption map.
Figure 4:
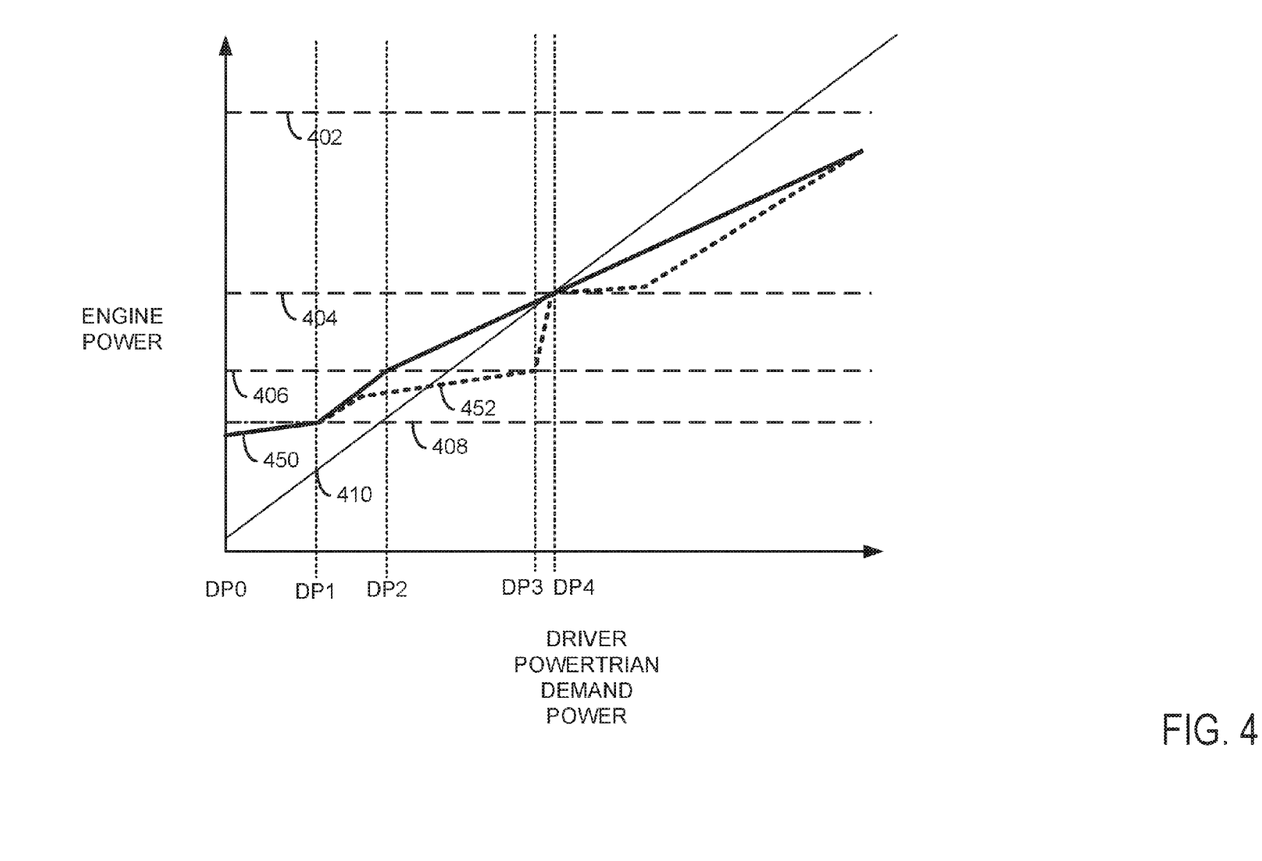
FIG. 4 is a plot showing an example way to reduce engine operation in a low engine operating efficiency region located between two higher engine operating efficiency regions.

Referring now to FIG. 3, an example plot or map of engine brake specific fuel consumption is shown. The engine brake specific fuel consumption map is a basis for distributing a driver demand power between the engine and the ISG, or electric motor power via battery power. The vertical axis represents engine torque and the horizontal axis represents engine speed. Engine torque increases in the direction of the vertical axis arrow and engine speed increases in the direction of the horizontal axis arrow.

Curves 306, 304, 302, represent constant powertrain power curves. Curves 320, 322, 324, 326, 328, 330, 332, 334, 336, 338, 340, 342, and 344 represent constant fuel consumption. Curves 320 and 324 represent a same low engine fuel consumption operating region (e.g., 235 gm/kWh). Curve 322 represents a higher engine fuel consumption operating region (e.g., 240 gm/kWh). Curve 326 represents 240 gm/kWh, curve 328 represents 245 gm/kWh, curve 330 represents 250 gm/kWh, curve 332 represents 255 gm/kWh, curve 334 represents 260 gm/kWh, curve 338 represents 290 gm/kWh, curve 340 represents 350 gm/kWh, curve 342 represents 400 gm/kWh, curve 344 represents 450 gm/kWh. Curve 302 represents 120 kW of request constant power, curve 304 represents 80 kW of requested constant power, and curve 306 represents 40 kW of requested constant power. Curves 320-344 may be formed by operating an engine at various speeds and torques, plotting fuel consumption values for the various engine speeds and torques, then connecting like fuel consumption rates with lines. The fuel consumption regions outlined by the curves 320-344 may be representative of those of a highly tuned and optimized engine.

If an engine is operating at speed and torque for operating conditions 360 based on a driver powertrain power request equal to 40 kW (e.g., line 306), engine and powertrain efficiency may be improved by operating the engine at a speed and torque that is within curve 320. In particular, for increasing powertrain efficiency while maintaining a constant vehicle speed or constant vehicle acceleration, engine torque may be increased from a level shown at 360 to an engine torque level corresponding to the location the arrow extending from 360 intersects the low engine fuel consumption region encircled by curve 320. However, this increased engine torque will increase engine power. Consequently, motor power may be reduced by an equivalent magnitude to provide a desired driver demand power (e.g., Pdd (driver demand power)=Peng (engine power)+Pbatt (battery power consumed). In a one motor system Pbatt=Pmot (motor power). To provide the driver demand power while increasing engine torque, motor torque is decreased (e.g., made more negative) so that $T_{DD}=T_{ENG}*_{k1}+T_{MOT}*_{k2}$, where $T_{DD}$ is driver demand for a request powertrain power, $T_{ENG}$ is engine torque, k1 and k2 are constants for any gearing between the motor and engine, and $T_{MOT}$ is motor torque. In this way, the powertrain efficiency may be improved by adjusting engine and motor operating conditions.

If an engine is operating at speed and torque for operating conditions 370 based on a driver powertrain power request equal to 120 kW (e.g., line 302), engine and powertrain efficiency may be improved by operating the engine at a speed and torque that is within curve 320. Specifically, for increasing powertrain efficiency while maintaining a constant vehicle speed, engine torque may be decreased from a level shown at 370 to an engine torque level corresponding to the location the arrow extending from 370 intersects curve 310 while maintaining constant engine speed. At the same time engine torque is decreasing, motor torque is increased and battery power output is increased equal to the decrease in engine power. In this way, the powertrain efficiency may be improved by adjusting engine and motor operating conditions.

Figure 6:
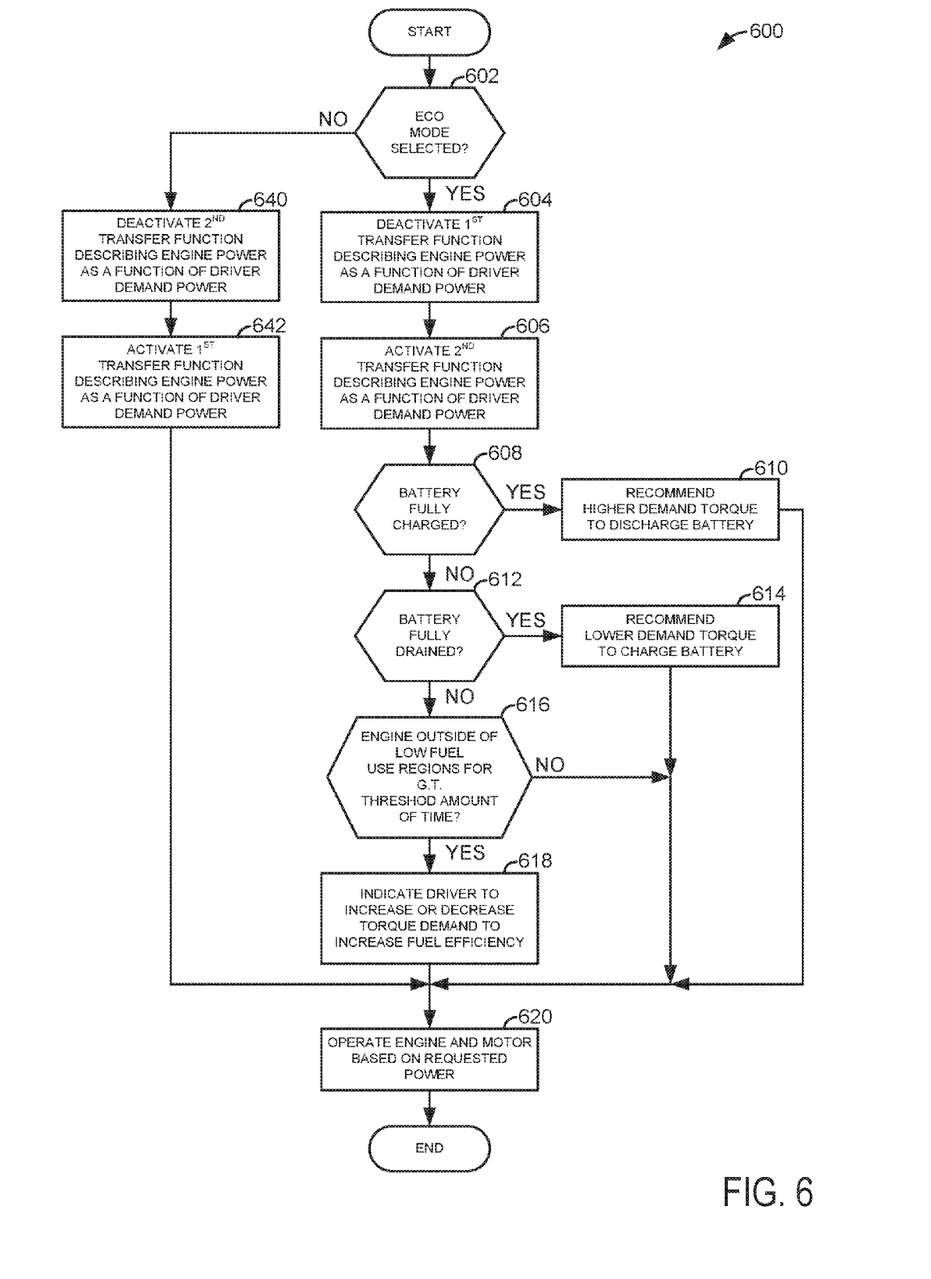
FIG. 6 shows an example flowchart for operating the system shown in FIGS. 1 and 2.

The method of FIG. 6 provides for transitioning from a first low engine fuel consumption region (e.g., the area within curve 320) to a second low engine fuel consumption region (e.g., the area within curve 324) to conserve fuel and change engine operating conditions from a first power output level to a second power output level. Arrow 350 shows one trajectory for transitioning engine operating conditions between the first low engine fuel consumption region to the second low engine fuel consumption region. The region between curves 320 and 324 is a higher engine fuel consumption region. As such, it may be desirable to spend a reduced amount of time in the region between curves 320 and 324.

Engine power output is lower within the region encircled by curve 320 as compared to engine output within the area encircled by curve 324. By moving engine operating conditions between the area encircled by curve 320 and the area encircled by curve 324, engine fuel consumption may be maintained at a low level, excepting the time to change engine operating conditions from curve 320 to curve 324, while engine output power is varied. Thus, a greater wider engine power output range may be provided by transitioning engine operating conditions between two low engine fuel consumption regions and engine efficiency may be maintained by operating the engine at conditions within the low engine fuel consumption regions for a greater quantity of driver demanded powers, therefore resulting in a greater proportion of time of a drive trip spent in the more efficient regions.

Referring now to FIG. 4, a plot that shows an example way to reduce engine operation in a low engine operating efficiency region located between two higher engine operating efficiency regions. The vertical axis represents requested engine power and requested engine power increases in the direction of the vertical axis arrow. The horizontal axis represents driver powertrain demand power and driver powertrain demand power increases in the direction of the horizontal axis arrow. In one example, driver powertrain demand powertrain power is based on accelerator pedal position and vehicle speed. In particular, empirically determined values of driver powertrain demand power are stored in a function or table that is indexed by accelerator pedal position and vehicle speed. The table or function outputs driver powertrain demand power.

Horizontal lines 408 and 406 bound a first engine power region of higher engine fuel efficiency (e.g., the area encircled by curve 320 of FIG. 3). Horizontal lines 404 and 402 bound a second engine power region of higher engine fuel efficiency (e.g., the area encircled by curve 324 of FIG. 3). Vertical lines at locations DP0-DP4 represent different levels of driver powertrain demand power.

Line 410 represents a line where battery charging by the engine via the motor is zero or not provided. The vehicle battery is charged at engine power levels above line 410 and the vehicle battery is discharged at engine power levels below line 410.

Heavy line 450 represents a base relationship between driver powertrain demand power and requested engine power. Dashed line 452 represents a relationship between driver powertrain demand power and requested engine power when economy mode is selected by a driver or controller.

When a driver requests powertrain power levels between DP0 and DP1 while the base relationship 450 is activated, engine power increases slowly from an initial non-zero power level. When a driver requests powertrain power levels between DP0 and DP1 while the economy mode relationship 452 is activated, engine power increases slowly the same as the base. The vehicle battery is charged by the engine at these requested powertrain power levels.

When a driver requests powertrain power levels between DP1 and DP2 while the base relationship 450 is activated, engine power increases at a higher rate indicated by the increase in slope of line 450. When a driver requests powertrain power levels between DP1 and DP2 while the economy mode relationship 452 is activated, engine power is increased at a slope less than the slope of line 450 between DP1 and DP2, but the slope of line 452 is further reduced so that requested engine power increases less for a change in driver powertrain demand power as compared to line 450. Therefore, relationship or profile 452 stays in center sweet spot between horizontal lines 408 and 406 that bounds a first engine power region of higher engine fuel efficiency (e.g., the area encircled by curve 320 of FIG. 3).

When a driver requests powertrain power levels between DP2 and DP3, engine power increases at a slightly lower rate indicated by the decrease in slope of line 450. Engine power increases at a lower rate versus driver demand power when a driver requests powertrain power levels between DP2 and DP3 is requested while the economy mode relationship 452 is activated. Thus, because engine power increases less for a driver powertrain demand power between DP1 and DP3 for the economy mode relationship 452, engine power remains between the region bounded by lines 408 and 406, where engine fuel efficiency is improved as compared to the region between line 406 and line 404. The fuel economy may be greatly improved when the economy mode is active for driver demand powers between DP2 and DP3. The vehicle battery is also discharged for relationship 452 when it crosses below line 410.

When a driver requests powertrain power levels between DP3 and DP4, engine power increases at a same rate as indicated by the constant slope of line 450. When a driver requests powertrain power levels between DP3 and DP4 while the economy mode relationship 452 is activated, the engine power increases at a faster rate as indicated by the increase in the slope of line 452 between DP3 and DP4. Consequently, engine power increases to a level within the area bounded by lines 404 and 402 with only a small increase in driver powertrain demand power when economy mode relationship 452 is active. Therefore, the engine may operate at less efficient operating conditions because economy mode relationship 452 is active for a much smaller range of driver powertrain demand power than the base relationship 450. As a result, the driver may be prone to transition the engine between the first low engine fuel consumption region (e.g., bounded by lines 408 and 406) and the second low engine fuel consumption region (e.g., bounded by lines 404 and 402) via a small change in accelerator pedal position.

At driver powertrain demand powers greater than DP4, the engine power increases for both the base relationship 450 and the economy mode relationship 452. The economy mode relationship 452 indicates two different line slopes above DP4, but one slope may be used if desired.

In this way, the economy mode relationship may move from the first engine low fuel consumption region to the second engine low fuel consumption region with a much smaller change in accelerator pedal position. In particular, the base relationship 450 moves from the first engine low fuel consumption region to the second engine low fuel consumption region between DP2 and DP4, whereas the economy relationship 452 moves from the first engine low fuel consumption region to the second engine low fuel consumption region between DP3 and DP4.

Figure 5:
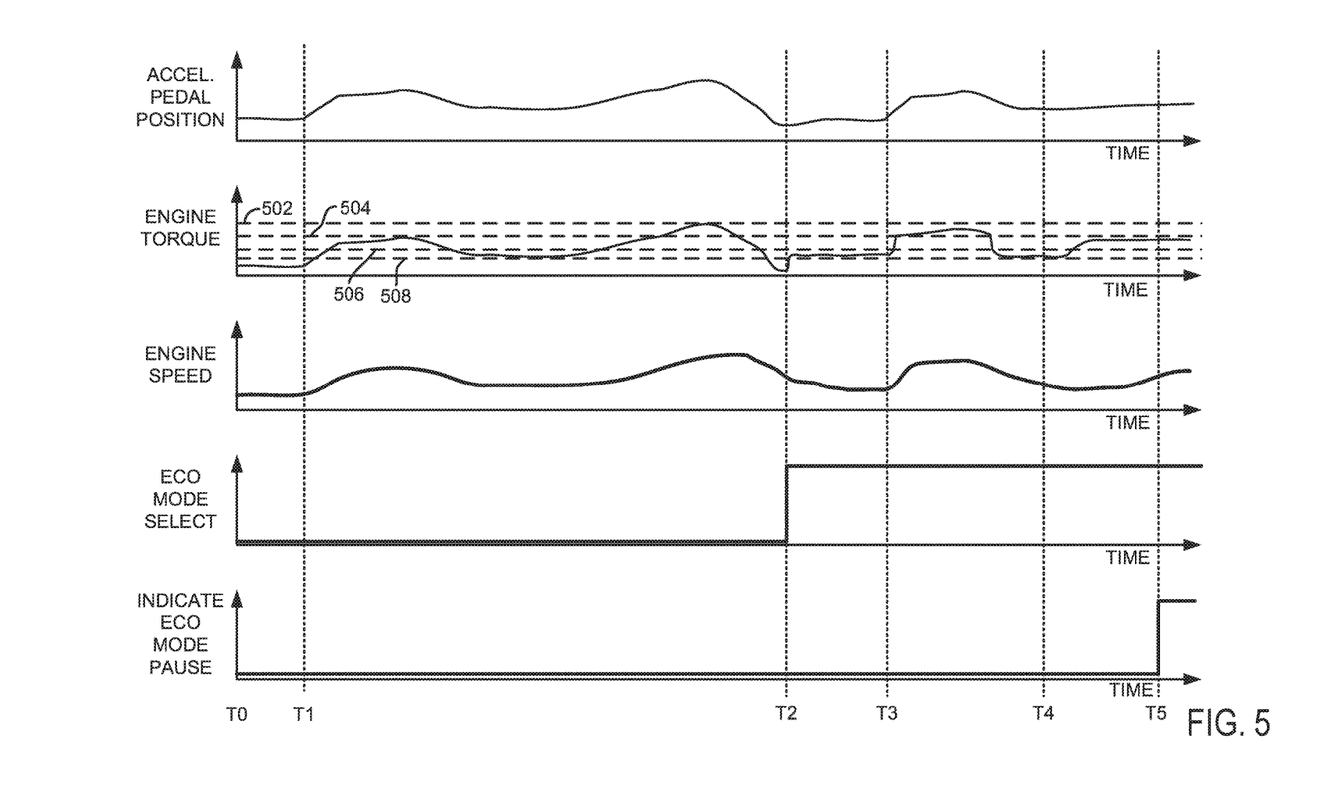
FIG. 5 is a plot of an example vehicle operating sequence.

Referring now to FIG. 5, a plot of an example vehicle operating sequence is shown. The operating sequence of FIG. 5 may be provided via the system of FIGS. 1 and 2 according to the method of FIG. 6. FIG. 5 shows five plots. The plots are time aligned and occur at the same time. Vertical markers at times T0-T5 represent times of interest during the sequence.

The first plot from the top of FIG. 5 is a plot of accelerator pedal position versus time. The horizontal axis represents time and time increases from the left side of the plot to the right side of the plot. The vertical axis represents accelerator pedal position and accelerator pedal position increases in the direction of the vertical axis arrow.

The second plot from the top of FIG. 5 is a plot of engine torque versus time. The horizontal axis represents time and time increases from the left side of the plot to the right side of the plot. The vertical axis represents engine torque and engine torque increases in the direction of the vertical axis arrow. Horizontal line 502 represents an upper bound of a second engine power region of higher engine fuel efficiency. Horizontal line 504 represents a lower bound of the second engine power region of higher engine fuel efficiency. Horizontal line 506 represents an upper bound of a first engine power region of higher engine fuel efficiency. Horizontal line 508 represents a lower bound of the first engine power region of higher engine fuel efficiency. The engine is operating in a higher fuel efficiency region when the engine torque trace is within the first or second engine power region of higher fuel efficiency.

The third plot from the top of FIG. 5 is a plot of engine speed versus time. The vertical axis represents engine speed and engine speed increases in the direction of the vertical axis arrow. The horizontal axis represents time and time increases from the left side of the plot to the right side of the plot.

The fourth plot from the top of FIG. 5 is a plot of economy (ECO) mode select versus time. The vertical axis represents economy mode state and economy mode is selected when the trace is at a higher level near the vertical axis arrow. The horizontal axis represents time and time increases from the left side of the plot to the right side of the plot.

The fifth plot from the top of FIG. 5 is a plot economy mode pause state versus time. The horizontal axis represents time and time increases from the left side of the plot to the right side of the plot. The vertical axis represents economy mode pause state versus time and economy mode is in a pause state due to accelerator pedal position when the trace is at a higher level near the vertical axis arrow.

At time T0, the accelerator pedal is in a lower position and the engine torque is low. The engine is not operating in a higher fuel efficiency region. The engine speed is low and economy mode is not selected. The economy mode is not paused since economy mode is not selected.

At time T1, the driver applies the accelerator pedal and the engine torque increases. The engine speed also increases as the engine torque increases. Economy mode is not selected and the economy mode is not paused because of the accelerator pedal position.

Between time T1 and time T2, the accelerator pedal position increases and decreases in response to the driver. The engine torque increases gradually in response to the application of the accelerator pedal at time T1. The engine operates in the first engine power region of higher engine fuel efficiency and the second engine power region of higher engine fuel efficiency at various times between time T1 and time T2.

At time T2, the driver selects economy mode as indicated by the economy mode select trace transitioning to a higher level. The accelerator pedal position is at a lower level and the engine torque increases in response to entering economy mode. The increase in engine torque is converted to electrical energy by the motor charging the vehicle battery (not shown). The engine enters the first engine power region of higher engine fuel efficiency in response to entering economy mode.

At time T3, the driver applies the accelerator pedal at a same rate as shown at time T1. Thus, the accelerator pedal trajectories are the same at time T1 and time T3. However, since economy mode is selected, the engine torque increases at a faster rate to transition engine operating conditions between the first engine power region of higher engine fuel efficiency and the second engine power region of higher engine fuel efficiency. Consequently, the engine operates in the engine power region of lower engine fuel efficiency between lines 506 and 504 for a shorter period of time. Thus, in response to a first requested engine power trajectory based on a first accelerator pedal position progression (e.g., at time T1), engine operating conditions transition between two low engine fuel consumption operating regions in a first amount of time. Further, in response to a second requested engine power trajectory based on a second accelerator pedal position progression (e.g., at time T3), engine operating conditions transition between the two low engine fuel consumption operating regions in a second amount of time that is faster than the first amount of time, the first accelerator pedal position progression and the second accelerator pedal progression a same accelerator pedal progression.

Between time T3 and time T4, the accelerator pedal position increases and then decreases. The vehicle remains in economy mode and the engine operates most of the time in the first engine power region of higher engine fuel efficiency or the second engine power region of higher engine fuel efficiency.

At time T4, the driver gradually increases the accelerator pedal position. Shortly thereafter, engine torque increases and exits the first engine power region of higher engine fuel efficiency without entering the second engine power region of higher engine fuel efficiency. The engine speed increases gradually and the vehicle remains in an economy mode.

At time T5, a predetermined amount of time has passed since the engine exited the first engine power region of higher engine fuel efficiency. Consequently, the economy mode indicates a pause condition (not operating at efficient conditions) in economy mode so that the driver may be alerted to the vehicle providing less fuel economy than is desired. The driver may increase or decrease the accelerator pedal position to re-enter one of the more fuel efficient operating modes.

Referring now to FIG. 6, an example flowchart for operating a hybrid vehicle in economy mode is shown. At least portions of the method of FIG. 6 may be incorporated as executable instructions stored in non-transitory memory of the system shown in FIGS. 1 and 2. Additionally, portions of the method of FIG. 6 may take place in the physical world as operations or actions performed by a controller to transform an operating state of one or more devices. The method of FIG. 6 may also provide the operating sequence shown in FIG. 5.

At 602, method 600 judges if economy mode has been selected. Economy mode may be selected via a human/machine interface or alternatively by a controller selecting economy mode. If method 600 judges that economy mode is selected, the answer is yes and method 600 proceeds to 604. Otherwise, the answer is no and method 600 proceeds to 640.

At 640, method 600 deactivates a second transfer function that describes engine power as a function of driver demand power. The second transfer function may increase engine power in a larger amount for a smaller increase in driver demand power than the first transfer function by decreasing battery power delivered to the motor. In one example, the second transfer function may be similar to 452 of FIG. 4. Accelerator pedal position is not converted to engine power via the second transfer function when the second transfer function is deactivated. Method 600 proceeds to 642 after the second transfer function is deactivated.

At 642, method 600 activates the first transfer function that describes engine power as a function of driver demand power. The first transfer function may increase engine power in a smaller amount for an increase in driver demand power than the second transfer function during certain ranges of driver demand. In one example, the second transfer function may be similar to 450 of FIG. 4. Accelerator pedal position is converted to engine power via the first transfer function when the first transfer function is activated. Method 600 proceeds to 620 after the second transfer function is activated.

At 604, method 600 deactivates a first transfer function that describes engine power as a function of driver demand power. The first transfer function may increase engine power in a smaller amount for an increase in driver demand power than the second transfer function. Method 600 proceeds to 606 after the first transfer function is deactivated.

At 606, method 600 activates the second transfer function that describes engine power as a function of driver demand power. The second transfer function may increase engine power in a larger amount for an increase in driver demand power than the first transfer function. Accelerator pedal position is converted to engine power via the second transfer function when the second transfer function is activated. Method 600 proceeds to 608 after the second transfer function is activated.

At 608, method 600 judges if the vehicle's battery is fully charged. In one example, method 600 may judge that the vehicle's battery is fully charged based on a voltage of the battery. If method 600 judges that the battery is fully charged, the answer is yes and method 600 proceeds to 610. Otherwise, the answer is no and method 600 proceeds to 612.

At 610, method 600 makes a recommendation to the driver to operate the vehicle at a higher driver demand torque so that the battery may be discharged. The driver may command a higher demand torque if the vehicle is traveling at a speed lower than the speed limit or other conditions where higher driver demand torque may be accommodated. Method 600 proceeds to 620.

At 612, method 600 judges if the vehicle's battery is fully discharged. In one example, method 600 may judge that the vehicle's battery is fully discharged based on a voltage of the battery. If method 600 judges that the battery is fully discharged, the answer is yes and method 600 proceeds to 614. Otherwise, the answer is no and method 600 proceeds to 616.

At 614, method 600 makes a recommendation to the driver to operate the vehicle at a lower driver demand torque so that the battery may be charged via additional engine torque. The driver may command less demand torque where lower driver demand torque may be accommodated. Method 600 proceeds to 620.

At 616, method 600 judges if engine power is outside of an engine operating region of low engine fuel consumption for greater than (G.T.) a threshold amount of time. The engine operating regions of low fuel consumption may be mapped as a function of engine speed and torque as shown in FIG. 3. In one example, a counter is started when the engine is not operating in a low engine fuel consumption region. The counter counts time until the engine enters a low engine fuel consumption region. If method 600 judges that engine power is outside of an engine operating region of low engine fuel consumption for greater than a threshold amount of time, the answer is yes and method 600 proceeds to 618. Otherwise, the answer is no and method 600 proceeds to 620.

At 618, method 600 indicates to a driver to increase or decrease a torque demand to increase fuel efficiency. In one example, the indication may be provided to the driver via a haptic actuator that vibrates the accelerator pedal. Additionally, a visual indication may be provided to the driver via a human/machine interface. Method 600 proceeds to 620 after an indication is provided to the driver to change accelerator pedal position so that the engine enters a more efficient operating region (e.g., the first or second engine operating region of low engine fuel consumption).

At 620, the engine and motor are operated to provide a driver demand power. The driver demand power may be input via an accelerator pedal. The accelerator pedal position may be converted to a driver demand power via a function that relates accelerator pedal position and vehicle speed to driver demand power. The driver demand power is then converted to an engine power based on a first or second relationship between driver powertrain demand power and engine power. The motor power is then determined based on the equation $T_{DD}=T_{ENG}+T_{MOT}$, where $T_{DD}$ is driver demand for a request powertrain power, $T_{ENG}$ is engine torque, and $T_{MOT}$ is motor torque. Method 600 seeks to operate the engine at a torque that is within the first low engine fuel consumption operating region or the second low engine fuel consumption operating region via adjusting motor torque. Method 600 proceeds to exit after the engine and motor are operated to provide the requested driver demand power.

Thus, the method of FIG. 6 provides for a powertrain operating method, comprising: providing a first relationship between driver powertrain demand power and requested powertrain power via a controller in in an engine power region between a first engine low fuel consumption operating region and a second engine low fuel consumption operating region in a first operating mode; providing a second relationship between driver powertrain demand power and requested powertrain power (e.g., engine and motor power) via the controller in the engine power region in a second operating mode, the engine power region a higher engine fuel consumption region than the first and second engine low fuel consumption regions; and operating an engine in response to the first and second relationships.

In one example, the method includes where a slope of a line describing the second relationship is greater than a slope of a line describing the first relationship in the higher engine fuel consumption region. The method includes where the first engine low fuel consumption operating region and the second engine low fuel consumption operating region are based on an engine brake specific fuel consumption map. The method includes where the second engine power region is a higher engine power region than an engine power region within the first engine low fuel consumption operating region. The method includes where the second engine power region is a lower engine power region than an engine power region within the second engine low fuel consumption operating region. The method further comprises providing an indication to a driver to enter the second engine low fuel consumption region in response to a battery state of charge greater than a first threshold. The method further comprises providing an indication to a driver to enter the first engine low fuel consumption region in response to the battery state of charge being less than a second threshold.

The method of FIG. 6 also provides for a powertrain operating method, comprising: adjusting operation of an engine in response to a requested powertrain power in an engine high fuel consumption operating region positioned between a first engine low fuel consumption operating region and a second engine low fuel consumption operating region; and providing haptic feedback to a driver in response to the requested engine power being in the high fuel consumption operating region for greater than a threshold amount of time. The method includes where an engine power region within the engine high fuel consumption operating region is a higher engine power region than an engine power region within the first engine low fuel consumption operating region. The method includes where an engine power region within the engine high fuel consumption operating region is a lower engine power region than an engine power region within the second engine low fuel consumption operating region.

In some examples, the method of FIG. 6 includes where the haptic feedback is a vibrating accelerator pedal. The method includes where the haptic feedback is provided in a first mode and not in a second mode, the first mode a fuel economy mode. The method further comprises providing haptic feedback to the driver in response to battery state of charge being greater than a threshold, the haptic feedback a request to operate the engine in the second engine low fuel consumption operating region and not in the first engine low fuel consumption operating region. The method further comprises providing haptic feedback to the driver in response to battery state of charge being less than a threshold, the haptic feedback a request to operate the engine in the first engine low fuel consumption operating region and not in the second engine low fuel consumption operating region.

The method of FIG. 6 also provides for a powertrain operating method, comprising: in response to a first requested engine power trajectory based on a first accelerator pedal position progression, transitioning engine operating conditions between two low engine fuel consumption operating regions in a first amount of time; and in response to a second requested engine power trajectory based on a second accelerator pedal position progression, transitioning engine operating conditions between the two low engine fuel consumption operating regions in a second amount of time, the first accelerator pedal position progression and the second accelerator pedal progression a same accelerator pedal progression. The method includes where the first accelerator pedal position progression is an accelerator pedal movement from a first position to a second position in a period of time. The method includes where the first amount of time is greater than the second amount of time. The method includes where transitioning between two low engine fuel consumption operating regions includes operating an engine in an operating region of higher engine fuel consumption located in an engine brake specific fuel consumption map between the two low engine fuel consumption operating regions. The method further comprises adjusting motor operation to provide a desired powertrain torque when transitioning engine operating conditions between the two low engine fuel consumption operating regions. The method includes where the first requested engine power trajectory occurs during an economy mode, and where the second requested engine power trajectory occurs during a non-economy mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:
1. A hybrid powertrain operating method, comprising:
in response to a first requested engine power trajectory based on an accelerator pedal position progression, transitioning engine operating conditions between a first engine fuel consumption operating region of an engine brake specific fuel consumption (BSFC) map and a second engine fuel consumption operating region of the BSFC man in a first amount of time, the first engine fuel consumption operating region separated from the second engine fuel consumption operating region via engine speed and torque, where an engine consumes fuel in the first and second engine fuel consumption operating regions at an equal rate, and where a third engine fuel consumption operating region of the BSFC map exists in an engine speed and torque region between the engine speed and torque regions of the first and second engine fuel consumption operating regions, wherein the first and second engine fuel consumption operating regions are completely separated by the third engine fuel consumption operating region;

in response to a second requested engine power trajectory based on the accelerator pedal position progression, transitioning engine operating conditions between the first engine fuel consumption operating region and the second engine fuel consumption operating region in a second amount of time; and adjusting operation of a motor to provide a desired powertrain torque when transitioning engine operating conditions between the first and second engine fuel consumption operating regions.

2. The method of claim 1, where the accelerator pedal position progression is an accelerator pedal movement from a first position to a second position in a period of time, and further comprising:

converting the accelerator pedal position progression to the first requested engine power trajectory via a first engine power to accelerator pedal position relationship;

and converting the accelerator pedal position progression to the second requested engine power trajectory via a second engine power to accelerator pedal position relationship.

3. The method of claim 1, where transitioning between the first engine fuel consumption operating region and the second engine fuel consumption operating region includes operating the engine in the third engine fuel consumption operating region, where the engine consumes fuel while operating in the third engine fuel consumption operating region at a rate that is greater than when the engine operates in the first and second engine fuel consumption operating regions.

4. The method of claim 1, where the first requested engine power trajectory occurs during an economy mode, and where the second requested engine power trajectory occurs during a non-economy mode.

5. The method of claim 1, where the first and second engine fuel consumption operating regions are included in an engine brake specific fuel consumption map, and further comprising:

converting the accelerator pedal position progression into the first requested engine power trajectory via a first engine power to driver powertrain demand power relationship and converting the accelerator pedal position progression into the second requested engine power trajectory via a second engine power to driver powertrain demand power relationship, where the second engine power to driver powertrain demand power relationship increases engine power at a lower rate than the first engine power to driver powertrain demand power relationship for a range of engine power that bounds the first engine fuel consumption operating region in the engine brake specific fuel consumption map.

* * * * *